United States Patent [19]

Ohga et al.

[11] Patent Number: 5,148,525
[45] Date of Patent: Sep. 15, 1992

[54] MICROPROGRAM-CONTROLLED TYPE BUS CONTROL CIRCUIT

[75] Inventors: Shinji Ohga, Tokyo; Takumi Yamazaki, Ibaragi, both of Japan

[73] Assignee: NEC Corporation, Tokyo, Japan

[21] Appl. No.: 817,997

[22] Filed: Jan. 9, 1992

Related U.S. Application Data

[63] Continuation of Ser. No. 501,966, Mar. 30, 1990, abandoned, which is a continuation of Ser. No. 277,349, Nov. 29, 1988, abandoned.

[30] Foreign Application Priority Data

Nov. 30, 1987 [JP] Japan .................................. 62-303551

[51] Int. Cl.$^5$ ............................................. G06F 15/16
[52] U.S. Cl. ..................................................... 395/250
[58] Field of Search ......................... 395/250, 275, 325

[56] References Cited

U.S. PATENT DOCUMENTS

| | | | |
|---|---|---|---|
| 3,997,896 | 12/1976 | Cassarino, Jr. et al. | 340/172.5 |
| 4,151,592 | 4/1979 | Suzuki et al. | 364/200 |
| 4,438,492 | 3/1984 | Harmon, Jr. et al. | 364/200 |
| 4,495,569 | 1/1985 | Kagawa | 364/200 |
| 4,504,906 | 3/1985 | Itaya et al. | 364/200 |
| 4,594,659 | 6/1986 | Guenthner et al. | 364/200 |
| 4,598,362 | 7/1986 | Kinjo et al. | 364/200 |
| 4,639,859 | 1/1987 | Ott | 364/200 |
| 4,644,539 | 2/1987 | Sato | 371/11 |
| 4,742,453 | 5/1988 | Shibuya | 364/200 |

OTHER PUBLICATIONS

"Motorola", Microcomputers Hardware Handbook, 1982 copyright by ing. W. Hofacker GmbH, US-Distributior: ELCOMP Publishing, pp. 574–596.

*Primary Examiner*—Dale M. Shaw
*Assistant Examiner*—David D. Knepper
*Attorney, Agent, or Firm*—Foley & Lardner

[57] ABSTRACT

A bus control circuit controlled by a microprogram in which a bus is employed to transfer data among a plurality of processing units. A data storage circuit connected to the bus stores the data appearing thereon which is used for carrying out microinstructions until the time when a particular microinstruction is inhibited from being executed. The storage circuit stores the last data which appeared on the bus for the microinstruction but receives an interrupt signal which prevents the storage of any new data. Then, when the execution of the microinstruction is resumed, the last stored data in the storage circuit is transferred to the data bus for performance of the microinstruction.

7 Claims, 3 Drawing Sheets

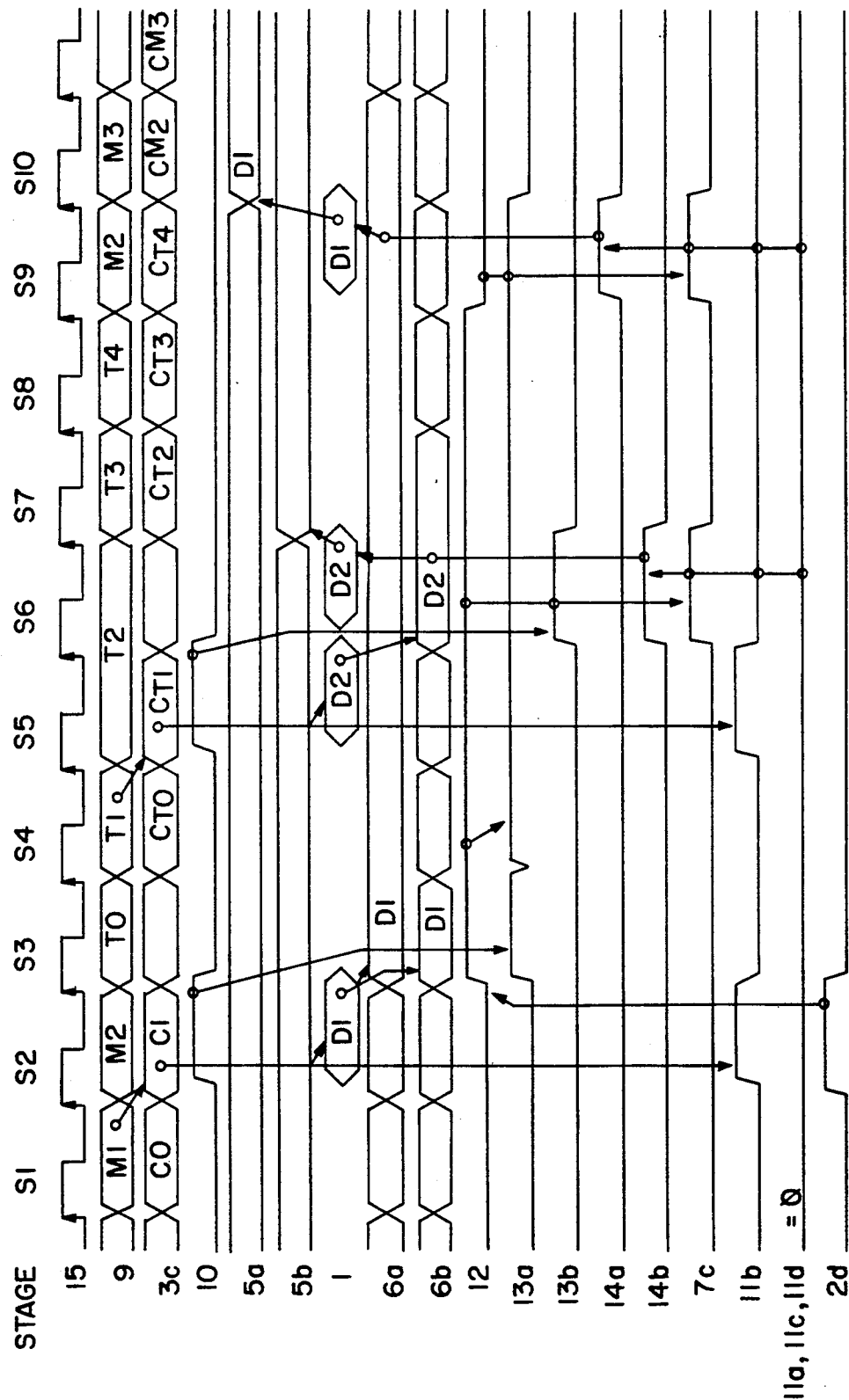

MICROPROGRAM-CONTROLLED TYPE BUS CONTROL CIRCUIT

This application is a continuation of U.S. patent application Ser. No. 07/501,966, filed Mar. 30, 1990, which is a continuation of U.S. patent application Ser. No. 07/277,349, filed on Nov. 29, 1988, both now abandoned.

BACKGROUND OF THE INVENTION

The present invention relates to a microprogram-controlled type bus control circuit for use in a data processor.

A pipeline control technique is employed to enhance the processing speed of a data processor. One example of such a technique is disclosed in U.S. Pat. No. 4,742,453.

In order to improve the performance of a central processing unit (CPU) of a data processor using a pipeline control technique, attempts are being made to speed up clock cycles used in the data processor.

A microprogram-controlled type CPU for a data processor includes an arithmetic execution unit, an instruction prefetch unit, and a cache memory unit and a system bus interface unit. The system bus interface unit controls a data transfer between the CPU and a main memory or an I/O processor, wherein data transfers among the units are controlled by microinstructions. The operation of a microinstruction in the pipeline control type data processor is disclosed in U.S. Pat. No. 4,644,539.

As a result, a delay time in individual units makes it impossible to let all the units operate in a single clock cycle, and this problem is coped with by dividing each operation into two unit operations. Thus various commands prepared from a microinstruction are given and received among various units in the first clock cycle. Then, the results of command execution are given and received in the next clock cycle. For instance, to take out an instruction or an operand from the cache memory unit, a command from the arithmetic execution unit or the prefetch unit is sent out to the cache memory unit and set in a command register within the cache memory unit in accordance with a microinstruction at the first clock. In the next clock cycle, the cache memory unit executes this command and outputs an instruction or operand data on a bus. In response to what the microinstruction indicates, data is taken in by the units which require the data.

It is now supposed that, when the transfer of a single instruction or operand data unit takes place over two or more clock cycles, the microinstruction is inhibited from execution at the timing of the data being output to the bus and taken in by said units which require the data. As a result, the data will no longer exist on the bus when the execution is resumed. Therefore, if a command is issued in response to a microinstruction immediately preceding the microinstruction inhibited from execution, the data can be transferred, but the CPU performance will deteriorate then. This performance deterioration of the CPU can be prevented by providing a backup circuit for the command register and resuming an execution in response to the content of the initial command register However, if there are a plurality of units taking two or more clocks to transfer data, each unit will require a backup circuit for its command register, inviting an increase in hardware volume.

SUMMARY OF THE INVENTION

One object of the present invention is, therefore, to provide a bus control circuit designed to be free from the above-stated performance deterioration due to resumption of an execution affected by an inhibiting signal during data transfer, and to make possible ready resumption of the inhibited execution without requiring a backup circuit for the command register of each unit.

A microprogram-controlled type bus control circuit in a central processing unit controlled by a microprogram according to one aspect of the invention includes:

a bus for transferring data among such various units as an arithmetic execution unit, an instruction prefetch unit and a cache unit;

a data storage circuit connected to this bus for storing data on the bus at each clock; and a data storage control circuit for monitoring a microinstruction execution level signal from a microprogram control unit for controlling each of said units, a microinstruction-execution-inhibiting signal, and a bus drive signal from each of said units, generating an instruction to inhibit intake of data on the bus to said data storage circuit at the time of inhibiting execution of a microinstruction or executing an interrupt and an instruction to output data to the bus from said data storage circuit at a time of resuming execution of the microinstruction.

BRIEF DESCRIPTION OF THE DRAWINGS

Features and advantages of the present invention will become more apparent from the detailed description hereunder when taken in conjunction with the accompanying drawings, in which:

FIGS. 2 and 3 illustrate the operation of the preferred embodiment of the invention.

In the drawings, the same reference numerals denote the same structural elements respectively.

DETAILED DESCRIPTION OF THE PREFERRED EMBODIMENT

A preferred embodiment of the present invention will be described in detail below with reference to the drawings.

Figure 1:
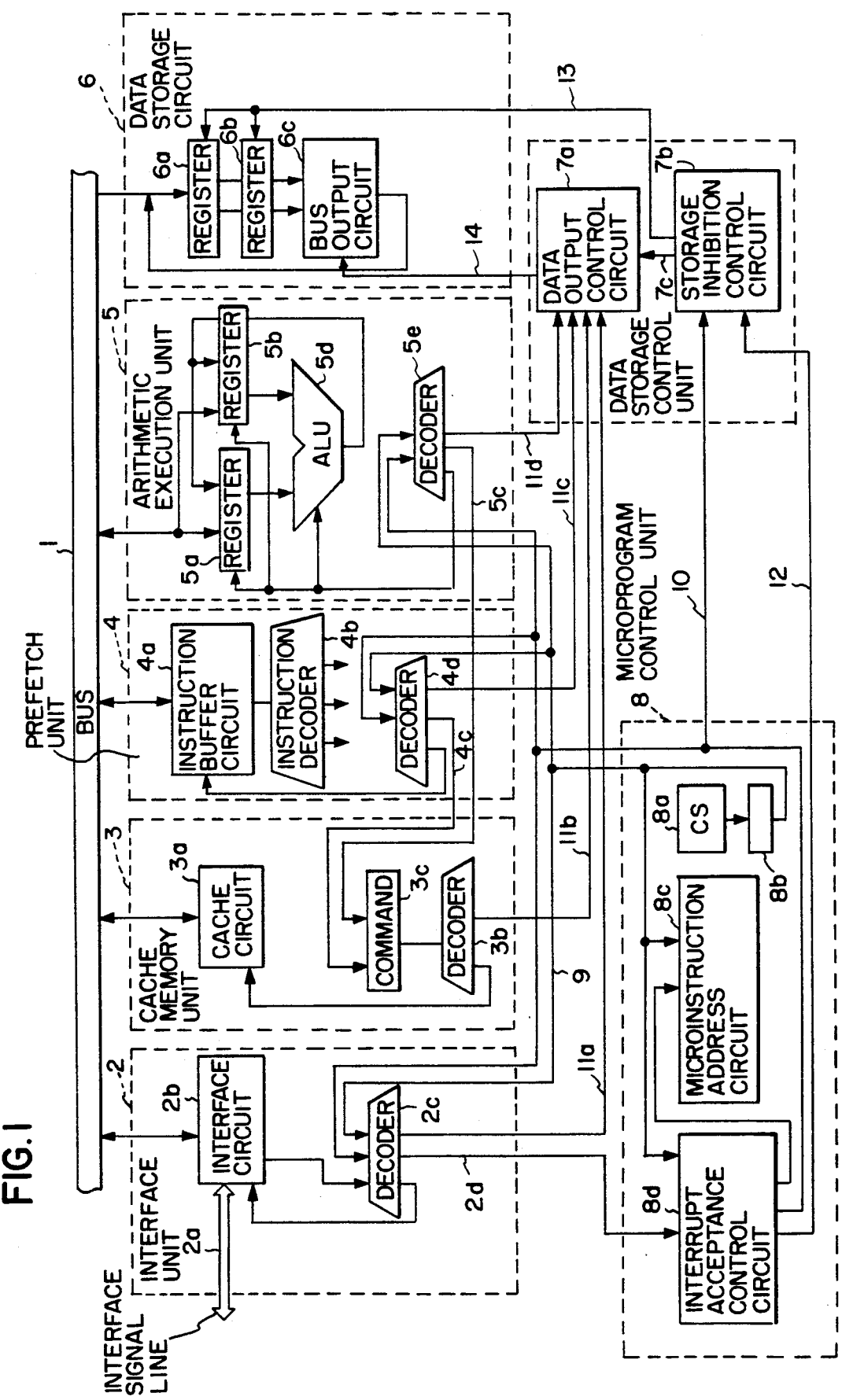
FIG. 1 illustrates a preferred embodiment of the invention.

Referring to FIG. 1, the embodiment of the invention comprises a bus 1 for transferring data among various units in a CPU; an interface unit 2 having interface signal lines 2a and an interface circuit 2b connected to the bus 1 and a decoder 2c for decoding microinstructions for controlling data transfer or communication to and from a main memory (not shown) or an input-output (I/O) processor (not shown); a cache memory unit 3 having a cache circuit 3a connected to said bus 1, a command register 3c and a decoder 3b for decoding commands for storing an instruction or operand data; a prefetch unit 4 having an instruction buffer circuit 4a connected to said bus 1, an instruction decoder 4b for decoding instructions from the instruction buffer circuit 4a and a decoder 4d for decoding microinstructions and generating commands to take out an instruction and control signals for prefetching instructions; an arithmetic execution unit 5 having registers 5a and 5b connected to the bus 1, an arithmetic and logical unit (ALU) 5d connected to these registers 5a and 5b, and a decoder 5e for decoding microinstructions and generating commands to take out data and control signals for executing arithmetic operations; a data storage control circuit 7 having a data output control circuit 7a and a storage inhibition control circuit 7b; a data storage circuit 6 having registers 6a and 6b responsive to a data storage inhibiting signal provided by way of a line 13 from the storage-inhibition-control circuit 7b of the foregoing circuit 7 for controlling storage operations, and a bus output circuit 6c responsive to a data-output-instruction signal 14 from said control circuit 7a of said circuit 7 for controlling data outputs to the bus 1; and a microprogram control unit 8 provided with a control storage (CS) 8a for storing a microprogram, a microinstruction register 8b for storing microinstructions from this CS 8a, a microinstruction address circuit 8c for generating addresses for the CS 8a, and an interrupt-acceptance-control circuit 8d for giving operational instructions to the units 2 through 5.

In this embodiment, a demand to take out an instruction or operand data, prepared in the prefetch unit 4 or the arithmetic execution unit 5 on the basis of a microinstruction, is sent out to the cache memory unit 3 by way of a command line 4c or 5c. The command sent out, after being stored in the command register 3c of the cache memory unit 3, is decoded by the decoder 3b. Responding to the result of decoding, the cache circuit 3a sends out data to the bus 1. In response to an execution inhibiting signal (NOEX signal) supplied by way of a line 10 to inhibit microprogram execution, a command supplied from the prefetch unit 4 and the arithmetic execution unit 5 to the memory unit 3 is also invalidated. Drive signals to be provided when data are output to the bus 1 from the interface unit 2, the cache memory unit 3, the prefetch unit 4 and arithmetic execution unit 5 are generated by having the decoders 2c, 3b, 4d and 5e of the units 2 to 5, respectively, decode a microinstruction given through a line 9 from the microinstruction register 8b or a command from the command register 3c, and sent out to lines 11a to 11d. Responding to these bus drive signals supplied via the lines 11a to 11d, data are output to the bus 1.

Suppose, for instance, an interrupt demand from the I/O processor (not shown) is sent out to a line 2d via the interface unit 2 as an interrupt signal. Responding to this interrupt signal, the interrupt-acceptance-control-circuit 8d in the microprogram control unit 8 generates an execution level signal, which is valid from the start till the end of the interrupt processing, and supplies it to a line 12. The execution level signal indicates that the microprogram is processing an interrupt. On the basis of this execution level signal and the NOEX signal provided via the line 10, the storage-inhibition-control circuit 7b generates a data-storage-inhibiting signal and sends it out to the line 13, while at the same time generating and sending out to a line 7c a data-output-timing signal. In response to this data-output-timing signal and the bus drive signals supplied through the lines 11a to 11d, the data-output-control circuit 7a generates a data-output-instructing-signal and sends it out to the line 14. Responding to the data-storage-inhibiting-signal given via the line 13, the registers 6a and 6b of the data storage circuit 6 inhibit the intake of data from the bus 1 when the execution of a microinstruction is being inhibited or an interrupt is being processed. Then, as a result of this inhibition, data stored in the registers 6a and 6b are outputted to the bus 1 via the bus output circuit 6c in response to the data output instructing signal provided via the line 14.

Figure 2:
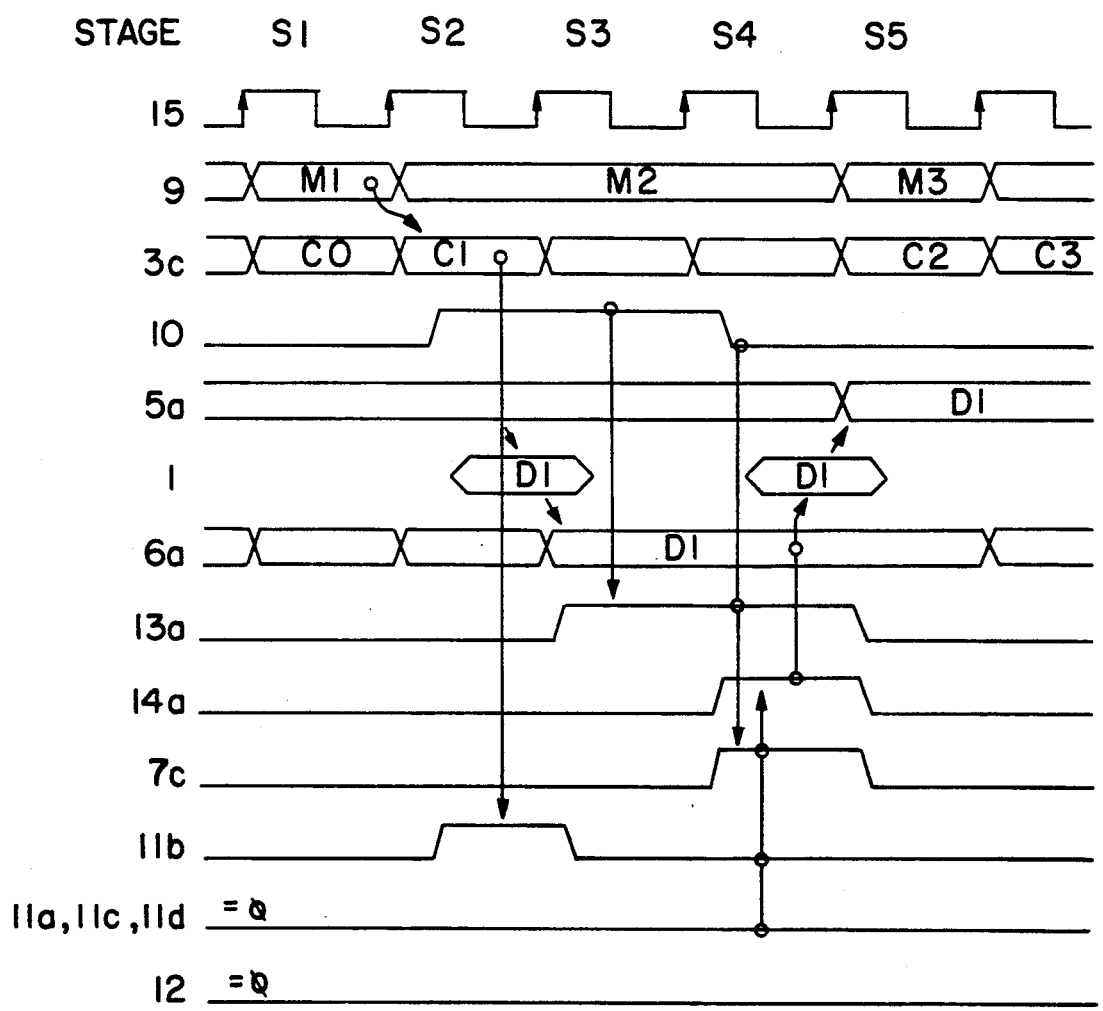

When execution is to be resumed directly from the state of inhibited execution the cache memory unit 3 operates depending on the content of the command register 3c, irrespective of the NOEX signal on the line 10. FIG. 2 shows the bus control operation in this case. Referring to FIGS. 1 and 2 together, each unit basically starts operating at the leading edge of a basic clock signal provided by way of a line 15 (not shown in FIG. 1) of the CPU.

At stage S1, in response to an instruction to take out an instruction or operand data according to a microinstruction M1 of the microprogram 9 stored in the control storage 8a, a command C1 for the cache memory unit 3 is supplied from the decoder 4d of the prefetch unit 4 or the decoder 5e of the arithmetic execution unit 5 to the command line 4c or 5c. And at the trailing edge of stage S1, or the front edge of stage S2, the command C1 is set in the command register 3c of the cache memory unit 3, which executes this command C1 at stage S2 to output data D1 on the bus 1 from the cache circuit 3a. At this time, in this particular embodiment of the invention, the NOEX signal is generated on the line 10 between stages S2 and S3 for some reason or other to inhibit the execution of a microinstruction M2 at stages S2 and S3, and the microinstruction M2 is executed at stage S4 instead. At this time, the data D1 output from the cache memory unit 3 at stage S2 is loaded into the register 6a of the data storage circuit 6. The data storage inhibiting signal on a line 13a, one of the lines 13, is prepared on the basis of a one-clock delay signal for the NOEX signal on the line 10. Responding to this signal, the register 6a inhibits the operation to store data from the bus 1 during stages S3 and S4. At stage 4, the data-storage inhibition-control circuit 7b, based on the NOEX signal on the line 10 and the execution level signal on the line 12, the latter indicating the absence of interrupt processing, supplies a data-output-timing signal to the line 7c. In response to this data-output-timing signal from the line 7c and drive signals provided through the lines 11a to 11d (not all the units are driven), the data-output-control-circuit 7a generates a data output instructing signal to instruct data outputting to the bus 1, and supplies it to a line 14a, one of the lines 14. Responsive to this signal, the bus output circuit 6c supplies the data D1 from the register 6a to the bus 1. Therefore, the data D1, which is to be output by the cache memory unit 3 when the microinstruction M2 is being executed, can be taken into the register 5a of the arithmetic execution unit 5.

Upon acceptance of an interrupt processing demand from outside, microinstruction execution is inhibited as required, resulting in trapping to an interrupt processing routine. After completion of the processing, execution is resumed from the original microinstruction, i.e., the microinstruction M2, whose execution was inhibited. FIG. 3 illustrates these operations on a time basis.

Referring now to FIGS. 1 and 3 together, the microinstruction M1 of the microprogram 9 stored in the microinstruction register 8b at stage S1 is decoded by the decoder 5e of the arithmetic execution unit 5, and the command C1 is set in the command register 3c via the command line 5c. The command C1 is decoded by the decoder 3b, and the result of this decoding is given to the cache circuit 3a. In response to the result of this decoding, the data D1 is output from the cache circuit 3a to the bus 1. This data D1 is loaded into the register 5a of the arithmetic execution unit 5 in accordance with the microinstruction M2. At the time of this loading, there is an interrupting factor, and an interrupt signal is sent out from the decoder 2c to the interrupt-acceptance-control circuit 8d via the line 2d. In response to this interrupt signal, the NOEX signal for trapping the microprogram to the interrupt processing routine is sent out from the interrupt-acceptance-control circuit 8d to the line 10 to inhibit the microinstruction M2 from execution. In response to this inhibition of execution, the register 5a is made unable to take in the data D1, which is taken into the registers 6a and 6b of the data storage circuit 6, though. During stages S3 through S8, interrupt processing is being executed (under microinstructions T0 through T4), and the fact of this interrupt processing being executed is communicated by the execution level signal provided from the microprogram control unit 8 via the line 12. Responsive to the execution level signal and the NOEX signal provided through the lines 12 and 10, respectively, the data-storage-inhibition control circuit 7b supplies a data-storage-inhibiting signal to the register 6a via the line 13a among the lines 13. In response to this data-storage-inhibiting signal, the register 6a inhibits the operation to store data from the bus 1 during the interrupt processing. Further, at stages S4, S5 and S6 during the interrupt processing, a command $C_{T1}$ responding to an instruction T1 is executed by the cache memory unit 3 via the decoder 5e, command line 5c, command register 3c and decoder 3b, and a data D2 is output from the cache circuit 3a to the bus 1. When this data D2 is stored into the register 5b of the arithmetic execution unit 5 in accordance with a microinstruction T2, the execution of the microinstruction T2 at stage S5 is inhibited in response to the NOEX signal given through the line 10. Meanwhile, the data D2 is taken out into the register 6b of the data storage circuit 6. Upon receipt of the NOEX signal and the execution level signal provided through the lines 10 and 12, respectively, the data-storage-inhibition-control circuit 7b outputs a data-storage-inhibiting signal to a line 13b, another of the lines 13. In response to this data-storage-inhibiting signal, the register 6b inhibits the operation to store data from the bus 1 at stage S6. At the time of resuming the execution of an interrupt processing program T2, responding to the NOEX signal and the execution level signal provided via the lines 10 and 12, respectively, the data storage inhibition control circuit 7b supplies a data output timing signal to the line 7c. In response to this data output timing signal and the bus drive signals provided via the lines 11a through 11d, the data output control circuit 7a generates a data-output-instructing signal on a line 14b, another of the lines 14. Further in response to this data-output-instructing signal, the data D2 stored in the register 6b is output to the bus 1, and loaded into the register 5b of the arithmetic execution unit 5. Then, after the completion of interrupt processing, the execution is resumed from the microinstruction M2 at stage S9. In response to the execution level signal and the NOEX signal provided via the lines 12 and 10, respectively, the data-storage-inhibition-control circuit 7b sends out an output-timing signal to the line 7c. In response to this output-timing signal and the bus drive signals for the various units provided via the lines 11a through 11d, the data-output-control circuit 7a outputs a data-output-instructing signal to the line 14a, one of the lines 14. Responding to this data-output-instructing signal, the bus output circuit 6c selects the data D1 from the register 6a, and outputs it to the bus 1. The data D1 sent out to the bus 1 is stored into the register 5a of the arithmetic execution unit 5 in response to an instruction from the microinstruction M2.

A feature of the present invention consists in that, when a microinstruction is inhibited from execution in accordance with an execution inhibiting signal, the execution level signal and bus drive signals for various units, the data storage circuit 6, having the few-word registers 6a and 6b, connected to the bus 1 within the CPU stores the data from the bus 1 to be taken by the arithmetic execution circuit 5, and outputs such data to the bus as required when the execution is resumed by monitoring the execution inhibiting signal, the execution level signal and bus drive signals for various units. Because of this feature, there is the advantage that, where the execution of an instruction or data transfer is to be accomplished over two clocks, the CPU performance would not be deteriorated by the inhibition of execution that may occur in any of the units requiring data. The invention can provide, because of the above-mentioned feature, the further benefits of requiring no backup circuits, such as command registers, in the units 2 through 5 and of permitting ready resumption of execution after the execution is inhibited during data transfer.

What is claimed is:

1. A bus control circuit in a central processing unit, said bus control circuit comprising:

a bus for transferring data among a plurality of operational units of said central processing unit, connected to said bus;

a data storage circuit, connected to said bus, for intake and storage of said data from said bus at each clock period and for outputting last stored data of said data to said bus; and a data-storage-control circuit, connected to said data storage circuit, for monitoring a microinstruction execution level signal from a microprogram control unit of said central processing unit, for monitoring a microinstruction-execution-inhibiting signal from said control unit, and for monitoring a bus drive signal from each of said operational units, said signals indicating when execution of a microinstruction is inhibited in said central processing unit and when, at a subsequent time, execution of said microinstruction is resumed, and for outputting to said data storage circuit a first command to inhibit said intake of said data from said bus into said data storage circuit when said signals indicate that said execution of said microinstruciton is inhibited and for outputting to said data storage circuit a second command to output said last stored data to said bus from said data storage circuit at said subsequent time when said signals indicate that said execution of said microinstruciton is resumed.

2. A bus control circuit in a central processing unit, said central processing unit including a plurality of operational units and a microprogram control unit for controlling said operational units, said microprogram control unit outputting both a microinstruction executing inhibiting signal and a microinstruction execution level signal, said signals indicating whether a microinstruction is inhibited from execution in said central processing unit, said bus control circuit comprising:

a bus for transferring data among said operational units;

a data storage circuit, coupled to said bus, for intaking said data from said bus, for storing said data from said bus and for returning said data to said bus; and a data storage control circuit, coupled to said data storage circuit, for monitoring said microinstruction executing inhibiting signal and said execution level signal, for outputting a first command to said data storage circuit to inhibit intaking said data from said bus when said signals indicate said microinstruction is inhibited from execution and for outputting a second command to said data storage circuit to resume returning said data to said bus when said signals indicate said microinstruction is resumed.

3. A bus control circuit as in claim 2, wherein said data storage circuit comprises a plurality of storage registers for respectively storing successive occurrences of said data from said bus and a bus output circuit for returning said data stored in said registers to said bus.

4. A bus control circuit as in claim 3, wherein said data storage control circuit outputs said first command to said registers for inhibiting said registers from intaking said data from said bus and outputs said second command to said bus output circuit to resume returning said data to said bus.

5. A bus control circuit as in claim 4, wherein said data storage control circuit comprises:
   a storage inhibition control circuit responsive to said microinstruction executing inhibiting signal and said microinstruction execution level signal for outputting said first command and a data output timing signal, and
   a data output control circuit responsive to bus drive signals from said operational units and to said data output timing signal for outputting said second command.

6. A bus control circuit as in claim 2, wherein said data storage circuit intakes all said data on said bus including input data for said operational units and output data from said operational units.

7. A bus control circuit in a central processing unit, said central processing unit including a plurality of operational units, each of said operational units receiving and transmitting data according to a clock period and providing a bus drive signal, and a microprogram control unit providing both a microinstruction execution level signal and a microinstruction-execution-inhibiting signal, any of said bus drive signal, said microinstruction execution level signal and said microinstruction-execution-inhibiting signal indicating when, in said central processing unit, execution of a microinstruction is being inhibited and, at a subsequent time, when said microinstruction is being resumed, said bus control circuit comprising:
   a bus for transferring said data;
   a data storage circuit, connected to said bus, for intake and storage of said data from said bus at each said clock period, for retaining last stored data of said data and for outputting said last stored data to said bus, said data storage unit including a control input circuit;
   a data-storage-control circuit, connected to said data storage circuit, for monitoring said bus drive signal, said microinstruction execution level signal and said microinstruction-execution-inhibiting signal and for outputting to said control input circuit of said data storage circuit a first control indication to inhibit said intake of said data from said bus into said data storage circuit when said signals indicate said execution of said microinstruction is being inhibited and, at said subsequent time, for outputting to said control input circuit of said data storage circuit a second control indication to output said last stored data from said data storage circuit when said signals indicate said execution of said microinstruction is being resumed.

* * * * *